United States Patent
Rivers et al.

(10) Patent No.: US 7,400,883 B2
(45) Date of Patent: Jul. 15, 2008

(54) METHODS, SYSTEMS, AND COMPUTER PROGRAM PRODUCTS FOR JOINT ACCOUNT REGISTERS

(75) Inventors: Paul B. Rivers, Cullman, AL (US); Frederick Diggle, III, Mountain Brook, AL (US)

(73) Assignee: AT&T Services, Inc., Wilmington, DE (US)

( * ) Notice: Subject to any disclaimer, the term of this patent is extended or adjusted under 35 U.S.C. 154(b) by 770 days.

(21) Appl. No.: 10/896,650

(22) Filed: Jul. 22, 2004

(65) Prior Publication Data

US 2006/0020479 A1 Jan. 26, 2006

(51) Int. Cl.
*H04Q 7/22* (2006.01)

(52) U.S. Cl. ............... 455/414.1; 455/412.1; 455/557; 705/68

(58) Field of Classification Search ......... 455/405–408, 455/414.1, 419, 420
See application file for complete search history.

(56) References Cited

U.S. PATENT DOCUMENTS

2005/0038744 A1* 2/2005 Viijoen .................. 705/42

* cited by examiner

*Primary Examiner*—Temica M Beamer
(74) *Attorney, Agent, or Firm*—Myers Bigel Sibley & Sajovec

(57) ABSTRACT

A first account profile is on a first mobile communications device and a second account profile is on a second mobile communications device. User input of transactional information is accepted on the first mobile communications device. The first account profile on the first mobile communications device is modified based on the transactional information. A message is transmitted including the transactional information to the second mobile communications device.

20 Claims, 5 Drawing Sheets

METHODS, SYSTEMS, AND COMPUTER PROGRAM PRODUCTS FOR JOINT ACCOUNT REGISTERS

FIELD OF THE INVENTION

The present invention relates to financial account tracking methods, systems and computer program products.

BACKGROUND OF THE INVENTION

Withdrawals and/or deposits to checking accounts generally take some period of time to clear an account. For example, the account user may write a check to a third party, and the third party may take days or weeks to cash the check. Therefore, the ledger balance of the account as recorded by the bank may not include all outstanding checks or transactions. Bank customers generally keep track of outstanding transactions in a register balance to avoid inadvertently overdrawing their account, and financial institutions may charge a penalty if an account is overdrawn. The "register" balance is the current balance on an account if all outstanding transactions were processed. For example, if an account had an initial balance of $500 and if a check were written on the account for $300, the register balance would be $200. However, until the check is cashed, the account would have an actual ledger balance of $500.

The register balance may be monitored by manually writing down all transactions in a register balance sheet, which bank customers may keep with their checkbook. Computer software has also been developed to monitor the register balance of an account, such as Quicken™ or Microsoft Money™ software. Software may also be used on hand held devices, such as a personal digital assistant (PDA) or mobile communications device, such as a cellular telephone.

Despite these techniques for monitoring the register balance of an account, financial services customers may still experience difficulty in monitoring the register balance of their accounts. Financial services customers may keep extra cash in the account in case a mistake in the register balance is made. Funds that could be used for other purposes may be tied up as a reserve in this attempt to avoid depleting the account. This money could otherwise be spent or invested, such as in an interest-bearing account or investment fund.

This problem may be exacerbated when more than one party uses a single account, such as may be the case with family members who share an account or with a business. Multiple parties to an account may struggle with how to communicate transactions to one another.

SUMMARY OF THE INVENTION

According to embodiments of the present invention, methods, systems, and computer program products provide communications between a first account profile on a first mobile communications device and a second account profile on a second mobile communications device. User input of transactional information is accepted on the first mobile communications device. The first account profile on the first mobile communications device is modified based on the transactional information. A message is transmitted including the transactional information to the second mobile communications device.

In some embodiments, another message can be received that includes transactional information from the second mobile communications device. The first account profile on the first mobile communications device can be modified based on the transactional information in the other message.

In some embodiments, the message is received at the second mobile communications device. The second account profile is modified on the second mobile communications device based on the transactional information.

In some embodiments, the step of transmitting the message includes automatically transmitting an identifier that identifies the message as including authorized transactional information. The identifier can include information identifying the message as originating in the first mobile communications device. The identifier can include a tone. A telecommunications link can be identified as a link including the message if the link includes the tone.

In some embodiments, the first account profile and the second account profile can include register checking information. The transactional information can include a withdrawal or deposit amount.

In some embodiments, a message can be received at the first mobile communications device from the second mobile communications device comprising at least a portion of the second account profile. The first account profile and the at least a portion of the second account profile can be compared. If the first account profile and the second account profile are not synchronized, an error message can be transmitted to the second communications device.

In some embodiments, a telecommunications link is automatically initiated between the first mobile communications device and the second mobile communications device to transmit the transactional information.

According to further embodiments of the present inventions, systems for providing communications between a first account profile on a first mobile communications device and a second account profile on a second mobile communications device are provided. A first mobile communications device can have a first account profile thereon and a second mobile communications device can have a second account profile thereon. The first mobile communications device is configured to accept transactional information and to transmit a message including the transactional information to the second mobile communications device. The second mobile communications device is configured to modify the second account profile based on the transactional information.

In some embodiments, the first and second mobile communications devices are cellular telephones. In some embodiments, the first and second mobile communications devices are personal digital assistant devices (PDA's).

As will further be appreciated by those of skill in the art, although described above primarily with reference to method aspects, the present invention may be embodied as methods, apparatus/systems and/or computer program products.

DETAILED DESCRIPTION

Figure 1:
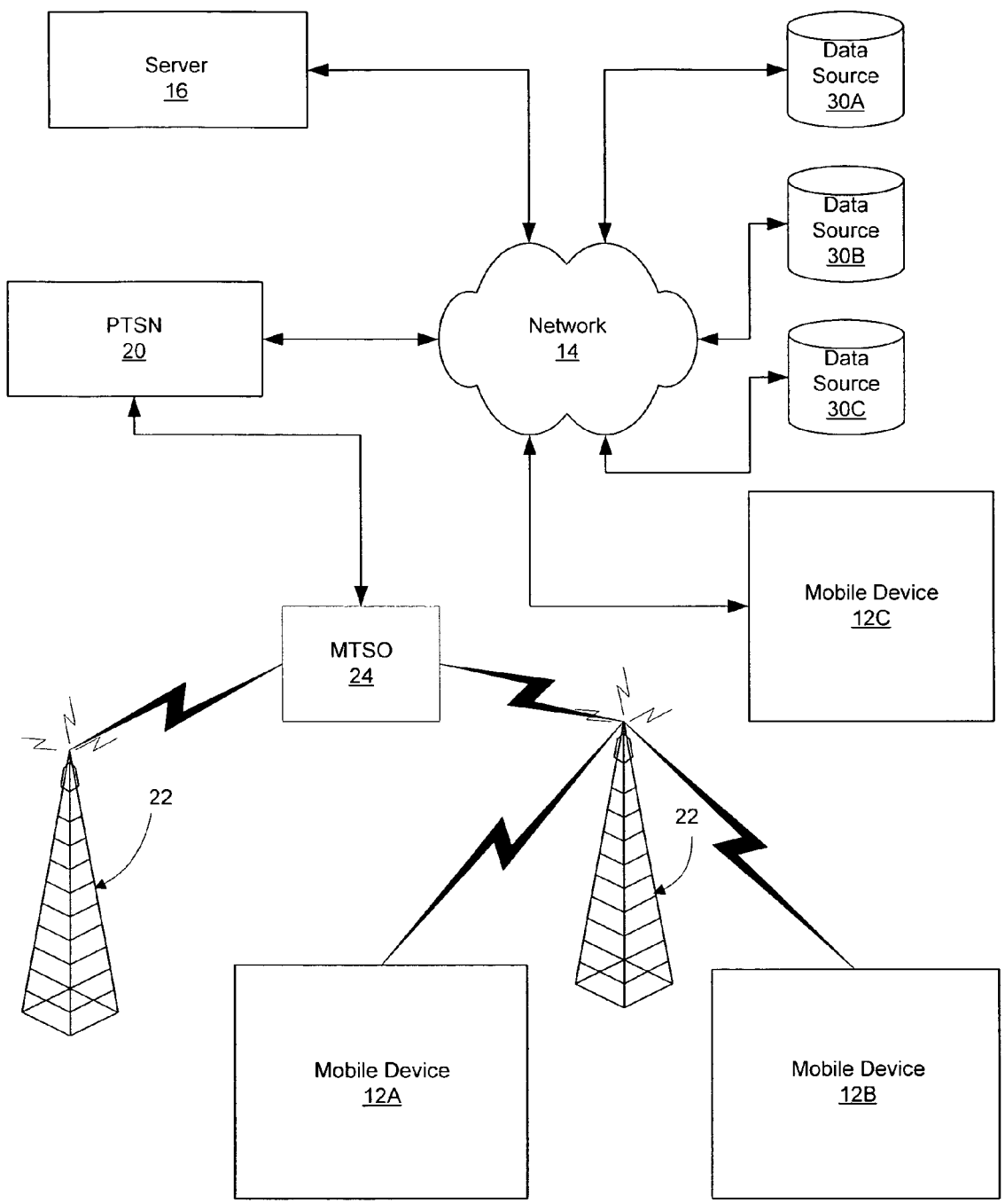
FIG. 1 is a block diagram of systems according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Embodiments according to the present invention can provide communications between a first account profile on a first mobile communications device and a second account profile on a second mobile communications device. Transactional information may be accepted from a user on one of the devices and a message including the transactional information may be transmitted to the other device. The account profiles can be modified based on the transactional information. Accordingly, two or more users may track a register balance of an account by communicating transactions using the communications devices.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's mobile communications device, partly on the user's mobile communications device, as a stand-alone software package, partly on the user's mobile communications device and partly on a remote computer or other device or entirely on a remote computer or device. In the latter scenario, the remote computer may be connected to the user's mobile communications device through a network, such as a public telecommunications switching network (PTSN), local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions, for example, on a mobile communications device. These computer program instructions may be provided to a mobile communications device that executes the instructions via the processor of the mobile communications device or other programmable data processing apparatus and creates a means for implementing the functions specified in the flowchart and/or block diagram block or blocks.

These computer program instructions may also be stored in a computer-readable memory that can direct a mobile communications device or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a mobile communications device or other programmable data processing apparatus to cause a series of operational steps to be performed on the mobile communications device or other programmable apparatus to produce a computer implemented process such that the instructions which execute on the mobile communications device or other programmable apparatus provide steps for implementing the functions specified in the flowchart and/or block diagram block or blocks.

Various embodiments of the present invention will now be described with reference to FIGS. 1 through 5. FIG. 1 illustrates a network environment in which embodiments of the present invention may be utilized. As will be appreciated by those of skill in the art, however, the operations of embodiments of the present invention may be carried out on a processing system that communicates with one or more other devices with or without access to a network such as an intranet or the Internet. As seen in FIG. 1, mobile devices 12A, 12B can communicate over a network 14. The mobile devices 12A, 12B can be radiotelephones or other handheld devices, such as a personal wirelessly enabled digital assistants (personal data assistants (PDAs), such as Palm Pilot™ or a Pocket PC™), smartphones, pagers, wireless messaging devices (such as a Blackberry™ wireless handheld device), wireless enabled laptop computers, other mobile communications devices and/or combinations thereof. The mobile devices 12A and 12B can communicate through one or more mobile telecommunications switching offices (MTSOs) 24 via base stations 22. The MTSO 24 may provide communications with a public telecommunications switching network (PTSN) 20, which can, in turn, can provide communications with the network 14. Personal computing device(s) 12C can access the network 14 as shown in FIG. 1, for example, through a modem, such as a dial-up telephone modem, a digital service line (DSL) modem, or a cable modem. The personal computing device 12C may be a mobile communications device, such as a laptop or PDA. Moreover, it should be understood that a wireless communications device can be used to connect the personal computing device 12B to the network 14 using various techniques, including those known to those of skill in the art, such as using a Wireless Fidelity (Wi-Fi) connection.

It should be understood that the various devices 12A, 12C, and 12C can communicate with the network 14 directly or indirectly, such as via other networks, including wireless networks. Moreover, devices can be provided that combine certain functionalities of the various devices 12A, 12C, and 12C. For example, a single device may be configured to connect to the network 14 through either the base station 22, the MTSO 24, the PTSN 20, a modem, a wireless network or a combination thereof.

The devices 12A, 12C, and 12C may utilize applications to communicate over the base station 22, the MTSO 24, and/or network 14 to another mobile device, stationary device, or data processing system, such as a server 16. The network 14 may be an intranet or the Internet or other networks known to those of skill in the art. The devices 12A, 12B, and 12C can include applications that can display the data in a display window, which can be provided on the devices 12A, 12B, and 12C and viewed and manipulated by the user.

As is further illustrated in FIG. 1, the server 16 can be in communication with data sources 30A, 30B, and 30C and the PTSN 20. The data sources 30A, 30B, and 30C can be computer servers, processing systems, or other networks that can send data to the clients 2A, 12B and 12C over the network 14.

Figure 2:
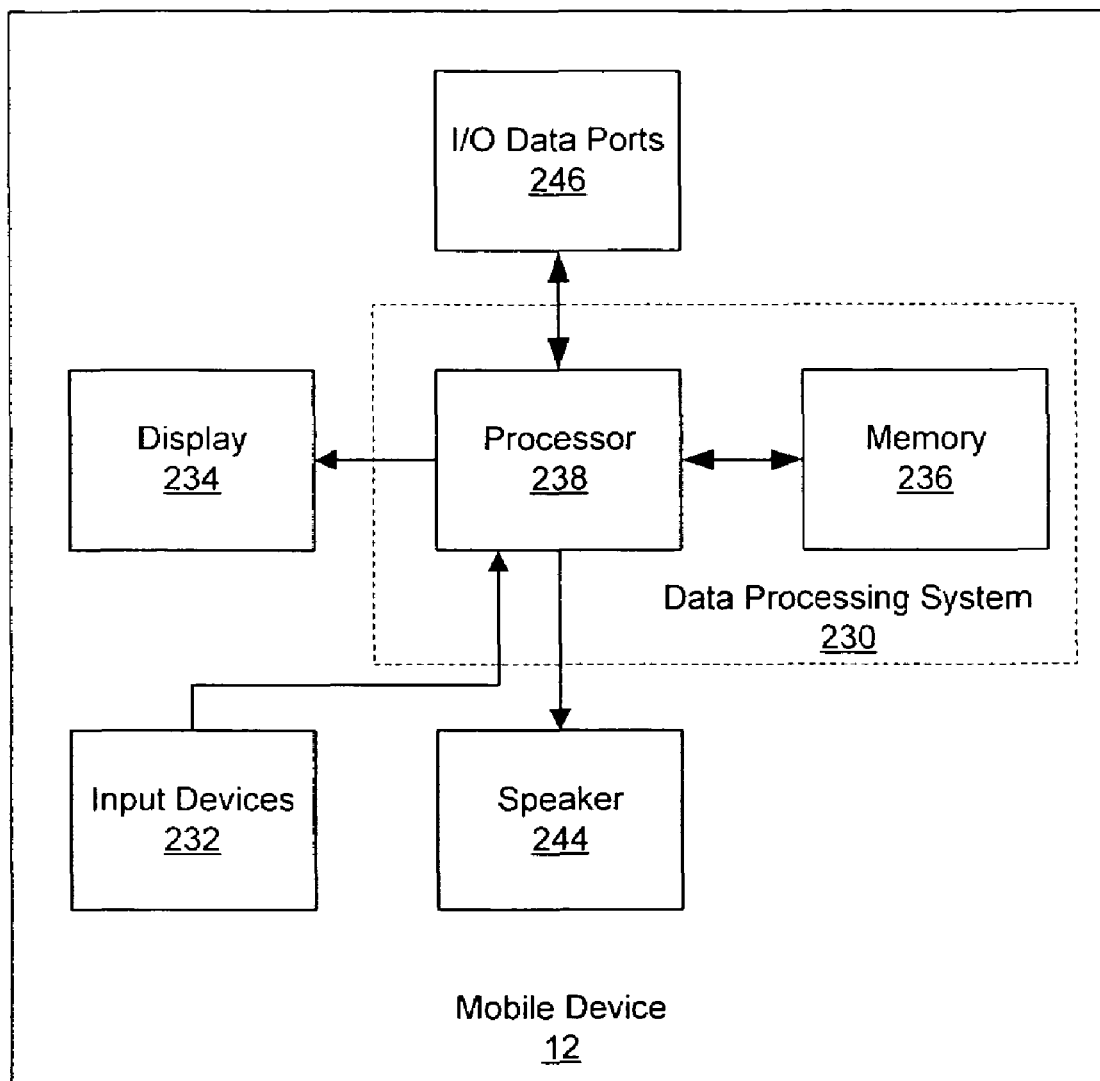
FIG. 2 is a block diagram of data processing systems according to embodiments of the present invention.

Referring to FIG. 2, exemplary embodiments of a mobile device 12 having a data processing system 230 in accordance with embodiments of the present invention are shown. The mobile device 12 may include input device(s) 232 such as a keyboard or keypad, touch sensitive screen, light sensitive screen, or mouse, a display 234, and a memory 236 that communicate with a processor 238. The mobile device 12 may further include a speaker 244, and a I/O data port(s) 246 that also communicates with the processor 238. The I/O data port 246 can be used to transfer information between the data processing system 230 and another computer system or a network (e.g., the Internet). These components may be conventional components such as those used in many conventional data processing systems, which may be configured to operate as described herein.

Figure 3:
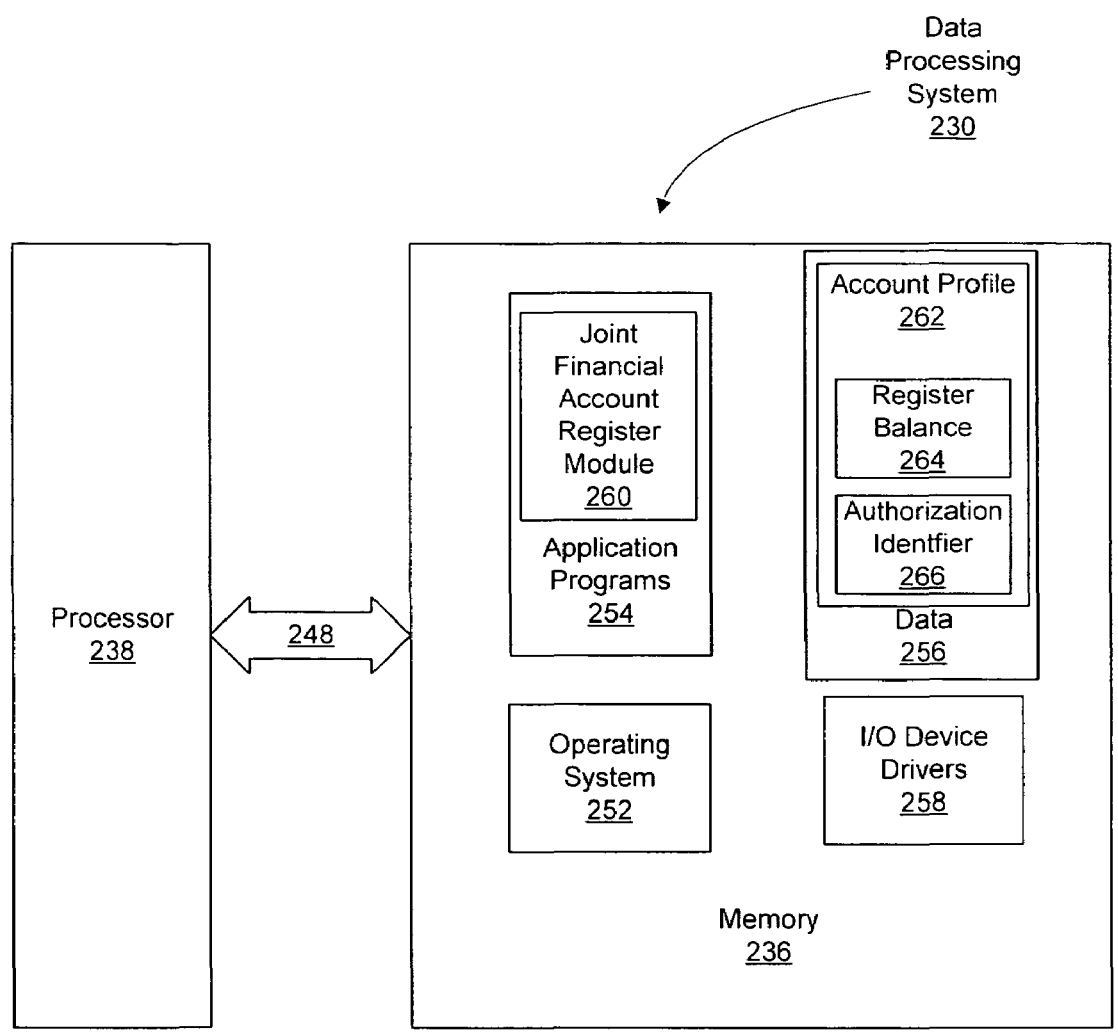
FIG. 3 is a detailed block diagram of data processing systems according to embodiments of the present invention.

FIG. 3 is a block diagram of embodiments of data processing systems that illustrates systems, methods, and computer program products in accordance with the present invention. A processor 238 communicates with memory 236 via an address/data bus 248. The processor 238 can be any commercially available or custom microprocessor. The memory 236 is representative of the overall hierarchy of memory devices containing the software and data used to implement the functionality of the data processing system 230. memory 236 can include, but is not limited to, the following types of devices: cache, ROM, EPROM, EEPROM, flash memory, SRAM, and DRAM.

As shown in FIG. 3, the memory 236 may include several categories of software and data used in the data processing system 230: an operating system 252; application programs 254; input/output (I/O) device drivers 258; and data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000, Windows NT, WindowsXP, or Windows Mobile from Microsoft Corporation, Redmond, Wash., Unix or Linux. The I/O device drivers 258 may include software routines accessed through the operating system 252 by the application program 254 to communicate with devices such as the input devices 232, the display 234, the speaker 244, the I/O data port(s) 246, and certain components of the memory 236. The application programs 254 are illustrative of the programs that implement the various features of the data processing system 230 and can include at least one application that provides operations of embodiments of the present invention. The data 256 represents the static and dynamic data used by the application programs 254, the operating system 252, the I/O device drivers 258, and other software programs that may reside in the memory 236.

In some embodiments, the data processing systems illustrated with respect to FIG. 3 may be included as part of a mobile communications device, such as on mobile terminal devices 12A, 12B, and 12C in FIG. 1. As is further seen in FIG. 3, the application programs 254 can include a joint financial account register module 260 and the data 256 can include an account profile 262. The joint financial account register module 260 may carry out operations as described herein for providing communications between two account profiles on respective mobile communications devices. The account profile 262 can include register checking information for a financial account, such as a register balance 264, and/or an authorization identifier(s) 266. In some embodiments, each of the mobile terminal clients 12A and 12B in FIG. 1 include account information, such as the account profile 262, and applications, such as joint financial account register module 260, to provide joint communications to the same financial account.

In some embodiments, the account profile 262 can include transactional entries that include data pertaining to the transaction, such as the date of the transaction, the payee, the amount of the transaction, a spending category (e.g., food, clothing, etc.), and any other information.

The joint financial account register module 260 can communicate with the account profile 262 to add the transactional information to the profile 262, for example, to update the balance using transactional information entered by a user. Other information that may be included in the transactional information, such as the date, payee, etc., may also be entered into the account profile 262. The joint financial account register module 260 can communicate or transmit transactional information, such as new transactions entered by a user, to another device. Messages including transactional information may also be received by the joint financial account register module 260, and the joint financial account register module 260 can enter the received information into the account profile 262. The authorization identifier 266 can be used to identify a message to another device as a message including authorized transactional information for entry into an account profile on the other device and/or to identify a message from another device as a message including authorized transactional information for entry in the account profile 262.

A message including transactional information may be sent to another device, for example, using an alphanumeric message protocol, such as Short Message Service ("SMS"), which can be provided as part of the Global System for Mobile telecommunications ("GSM"). A transactional information message may include data, for example, for entry into the account profile 262.

Although the present invention is illustrated, for example, with reference to a joint financial account register module 260, an account profile 262, a register balance 264, and an authorization identifier 266, as will be appreciated by those of skill in the art, the joint financial account register module 260, the account profile 262, the register balance 264, and the authorization identifier 266 may also be incorporated into other components, such as the operating system 252. Thus, the present invention should not be construed as limited to the configurations illustrated but is intended to encompass any configuration capable of carrying out the operations described herein.

Figure 4:
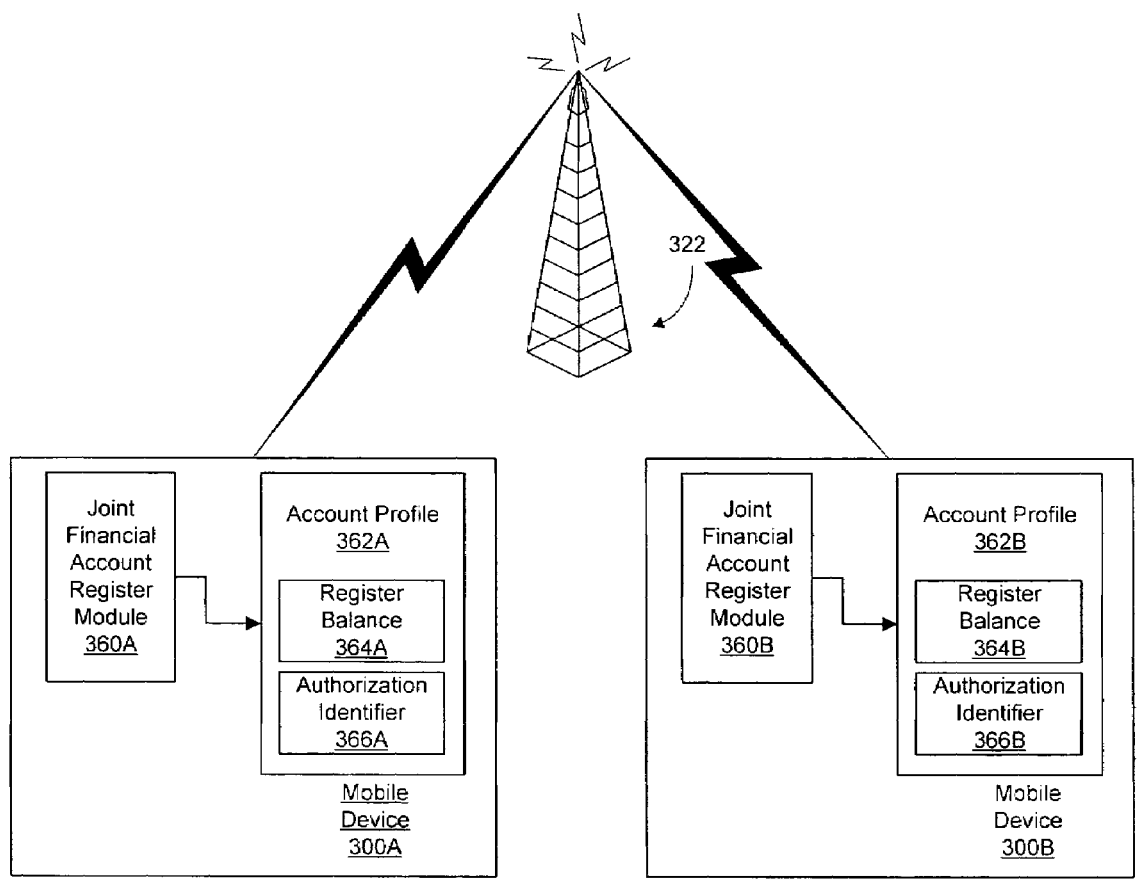
FIG. 4 is a block diagram of mobile terminals in a system according to embodiments of the present invention.

As illustrated in FIG. 4, mobile devices 300A and 300B can communicate with one another using base station 322. It should be understood that the mobile devices 300A and 300B can be provided as clients in a network, for example, as clients 12A, 12B or 12C in the network described with respect to FIG. 1. It should also be understood that the mobile devices 300A and 300B may include various functionalities and/or components, for example, the functionalities and/or components described with respect to the data processing system 230 of FIG. 2 and/or the processor 238 or memory 236 of FIG. 3.

The mobile devices 300A and 300B may each include a joint financial account register module 360A and 360B that communicates with an account profile 362A and 362B, respectively. The account profiles 362A and 362B can include respective register balances 364A and 364B and authorization identifiers 366A and 366B. The register balances 364A and 364B may be related to the same financial account, and the users of the mobile devices 300A and 300B may each have the ability to draft checks or deposit money into the account. Thus, the register balances 364A and 364B may be the same.

As an illustrative example, the user of device 300A may draft a check on the account and enter the amount of the transaction into the device 300A. The joint financial account register 360A can subtract the amount from the register balance 364A in the account profile 362A. The mobile device 300A can send a message including the transactional information to the mobile device 300B. The message can include an identifier, such as an authorization identifier 366A. The authorization identifier 366A can be an electronic marker to identify the message as including authorized transactional information, such as information identifying the message as originating in mobile device 300A or a particular code, signal or tone.

The mobile device 300B can receive the message from the mobile device 300A. The joint financial account register module 360B can check the message from the mobile device 300A to determine whether the message includes authorized transactional information. The determination of whether the message includes authorized transactional information may be based on an identifying the origin of the message. For example, the authorization identifier 366B can include instructions to accept a transaction delivered from a particular mobile device, such as the mobile device 300A. The origination of the message can be determined, for example, using caller identification techniques that may be provided on cellular telephones or other communications devices. A code, password, signal or tone contained in the communications from the mobile device 300A may also be used to identify the message as including authorized transactional information. For example, a code or password may be included as part of the authorization identifiers 366A and 366B. The joint financial account register module 360A may send a message including the code or password from the authorization identifier 366A to the device 300B, and the joint financial account register module 360B may determine whether the code or password is also included as part of the accepted authorization identifier 366B. If the joint financial account register module 360B recognized the code or password, then it can determine that the transactional information is authorized.

If the mobile device 300B determines that the message includes authorized transactional information, the joint financial account register module 360B can enter the transactional information into the account profile 362B. The joint financial account register module 360B can deduct the amount of the check from the register balance 364B in the account profile 362B. The mobile device 300B may send a confirmation to the mobile device 300A notifying the device 300A that the transaction has been entered into the account profile 362B. The devices 300A and 300B may also compare the register balance 364A and the register balance 364B to determine if the register balances 364A and 364B are synchronized to contain the same information. For example, the mobile device 300A may send a transactional information message that includes the register balance 366A to the device 300B. If the register balance 366A is not synchronized with (or equal to) the register balance 366B, the device 300B can transmit an error message to the device 300B. If an error message is received, the users of the respective devices 300A and 300B may consult with one another to determine why the register balances 366A and 366B may not be equal.

In some embodiments, the joint financial account register modules 360A and 360B may automatically communicate with one another to update the respective account profiles 362A and 362B. However, the joint financial account register modules 360A and 360B can request input from the user prior to entering a transaction into the account profile 362A and 362B. For example, the device 300A can send a message including transactional information to the device 300B. The device 300B can notify the user, such as by displaying a message or producing a sound, that the message has been received. The user can retrieve the message on the device 300B and determine whether or not to enter the transaction, for example, based on an identified source of the message or a code or password.

As another illustrative example, at least one of the devices 300A and 300B can be a cellular telephone and the authorization identifiers 366A and 366B can include a tone. A user can enter a check or debit card transaction into the device 300A. The device 300A may automatically dial the cellular telephone number of the other device 300B. The device 300B may utilize caller identification techniques known to those of skill in the art to identify the incoming call as a call from the device 300A. The device 300B may recognize that the call is from the device 300A and automatically answer the call. The device 300B can listen for the tone that indicates that an update to the account profile 362B is pending. If the signal is not detected, for example, because the call does not include transactional information, then the device 300B may initiate telephone protocol, such as ringing, to alert the user of the device 300B that an incoming call has been received. If the device 300B does not answer the call, then the call can be routed to voice mail. However, if the signal is detected by the device 300B, then the device 300B can send an acknowledgement tone prompting the device 300A to send the updated transactional information. After the device 300A sends the transactional information to the device 300B, the device 300B may send a confirmation message to confirm that the information has been received.

Although FIG. 4 has been described with respect to the device 300A sending a message to the device 300B, it should be understood that the functionality of the devices 300A and 300B may be interchangeable and that the device 300B may send/receive transactional information to/from the device 300A. It should also be understood that the devices 300A and 300B may provide communications to stand alone devices or other networked devices, such as a server(s) (e.g., server 16 in FIG. 1) from a financial institution, for example, so that the users of the devices 300A, 300B may send and/or receive information about the account, such as the ledger balance or other information regarding the account or financial services offered by the financial institution. However, in some embodiments, the devices 300A and 300B may communicate transactional information without requiring a server or other networked computer processor. In this case, the users of the devices 300A and 300B may communicate without a third party having access to the financial information for increased privacy protection.

Figure 5:
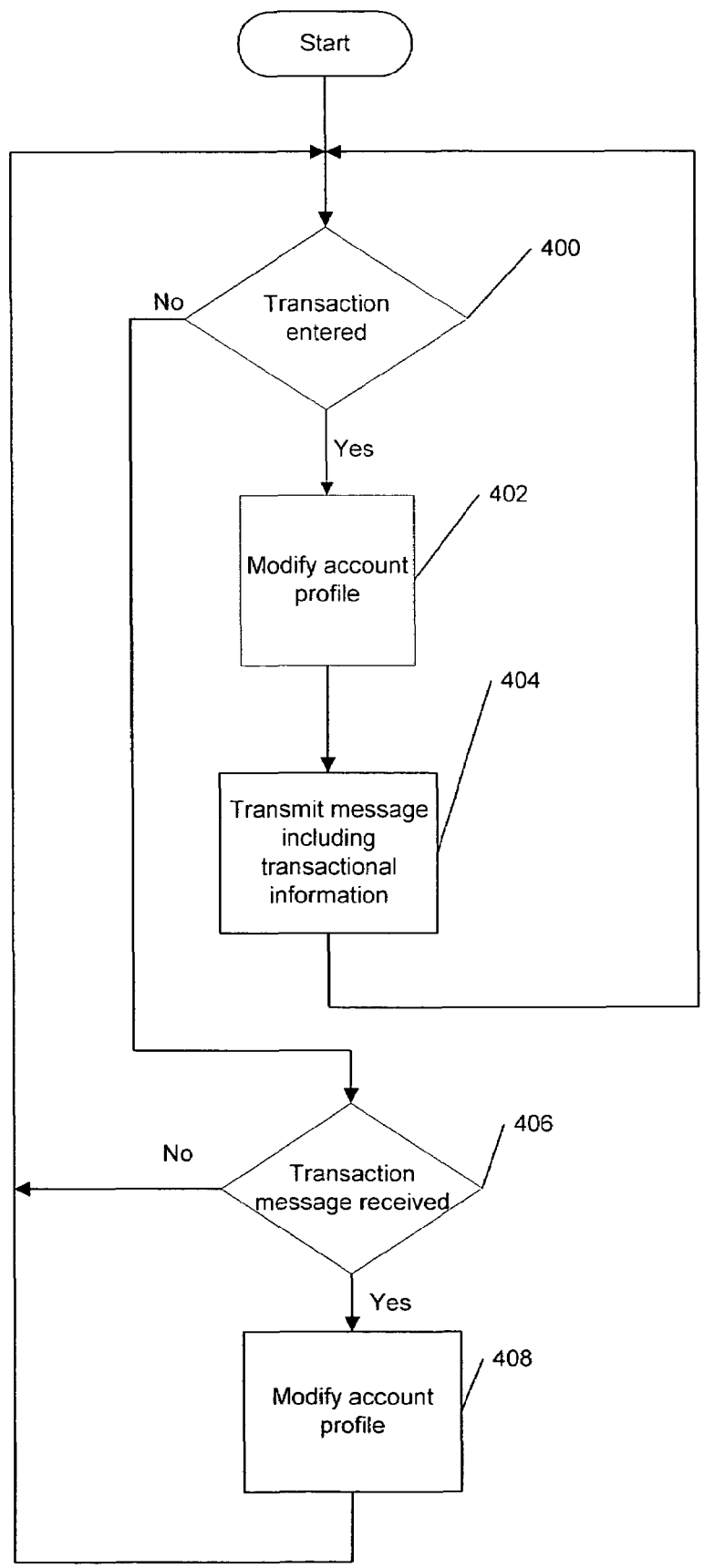
FIG. 5 is a flowchart illustrating operations according to embodiments of the present invention.

Embodiments of the present invention will now be described in more detail with reference to FIG. 5, which is a flowchart illustration of operations. A first account profile can be provided on a first device and a second account profile can be provided on a second device. The first and second account profiles can include balance information of an account. If transactional information is entered on one of the devices (Block 400), the device accepts the information and modifies the account profile on the device (Block 402). A message including the transactional information can be sent to the other device (Block 404). If a message including transactional information is received from the other device (Block 406), the account profile can be modified (Block 408).

In the drawings and specification, there have been disclosed certain embodiments of the invention and, although specific terms are employed, they are used in a generic and descriptive sense only and not for purposes of limitation, the scope of the invention being set forth in the following claims.

That which is claimed:

1. A method for providing communications between a first account profile on a first mobile communications device and a second account profile on a second mobile communications device, the method comprising: accepting user input of transactional information on the first mobile communications device; modifying the first account profile on the first mobile communications device based on the transactional information; transmitting a message including the transactional information to the second mobile communications device, wherein the first account profile is stored on the first mobile communications device and the second account profile is stored on the second mobile communications device, receiving a message at the first mobile communications device from the second mobile communications device comprising at least a portion of the second account profile; comparing the first account profile and the at least a portion of the second account profile; and if the first account profile and the second account profile are not synchronized, transmitting an error message to the second communications device.

2. The method of claim 1, further comprising:
receiving another message including transactional information from the second mobile communications device; and
modifying the first account profile on the first mobile communications device based on the transactional information in the other message.

3. The method of claim 1, further comprising:
receiving the message at the second mobile communications device; and
modifying the second account profile on the second mobile communications device based on the transactional information.

4. The method of claim 1, wherein the step of transmitting the message includes automatically transmitting an identifier that identifies the message as including authorized transactional information.

5. The method of claim 4, wherein the identifier includes information identifying the message as originating in the first mobile communications device.

6. The method of claim 4, wherein the identifier includes a tone and a telecommunications link is identified as a link including the message if the link includes the tone.

7. The method of claim 1, wherein the first account profile and the second account profile include register checking information.

8. The method of claim 7, wherein the transactional information includes a withdrawal or deposit amount.

9. The method of claim 1, comprising automatically initiating a telecommunications link between the first mobile communications device and the second mobile communications device to transmit the transactional information.

10. The method of claim 1, wherein the first mobile communications device and the second mobile communications device are cellular telephones.

11. A computer program product for providing joint communications between a first account profile on a first mobile communications device and a second account profile on a second mobile communications device, the computer program product comprising: a computer readable medium having computer readable program code embodied therein, the computer readable program code comprising: computer readable program code that is configured to accept user input of transactional information on the first mobile communications device; computer readable program code that is configured to modify the first account profile on the first mobile communications device based on the transactional information; computer readable program code that is configured to transmit a message including the transactional information to the second mobile communications device; computer readable program code that is configured to receive a message at the first mobile communications device from the second mobile communications device comprising at least a portion of the second account profile; computer readable program code that is configured to compare the first account profile and the at least a portion of the second account profile; and computer readable program code that is configured to transmit an error message to the second communications device if the first account profile and the second account profile are not synchronized.

12. The computer program product of claim 11, further comprising:
computer readable program code that is configured to receive another message including transactional information from the second mobile communications device; and
computer readable program code that is configured to modify the first account profile on the first mobile communications device based on the transactional information in the other message.

13. The computer program product of claim 11, wherein the computer program code configured to transmit the message includes computer program code that is configured to automatically transmit an identifier that identifies the message as including authorized transactional information.

14. The computer program product of claim 13, wherein the identifier includes information identifying the message as originating in the first mobile communications device.

15. The computer program product of claim 11, wherein the identifier includes a tone and a telecommunications link is identified as a link including the message if the link includes the tone.

16. The computer program product of claim 15, wherein the first account profile and the second account profile include register checking information.

17. The computer program product of claim 10, wherein the transactional information includes a withdrawal or deposit amount.

18. The computer program product of claim 11, further comprising computer program code that is configured to automatically initiate a telecommunications link between the first mobile communications device and the second mobile communications device to transmit the transactional information.

19. The computer program product of claim 11, wherein the first mobile communications device and the second mobile communications device are cellular telephones.

20. A system for providing communications between a first account profile on a first mobile communications device and a second account profile on a second mobile communications device, the system comprising: a first mobile communications device having a first account profile thereon; a second mobile communications device having a second account profile thereon; wherein the first mobile communications device is configured to accept transactional information and to transmit a message including the transactional information to the second mobile communications device and the second mobile communications device is configured to modify the second account profile based on the transactional information, wherein the first account profile is stored on the first mobile communications device and the second account profile is stored on the second mobile communications device, receiving a message at the first mobile communications device from the second mobile communications device comprising at least a portion of the second account profile; comparing the first account profile and the at least a portion of the second account profile; and if the first account profile and the second account profile are not synchronized, transmitting an error message to the second communications device.

* * * * *